Patented Aug. 2, 1927.

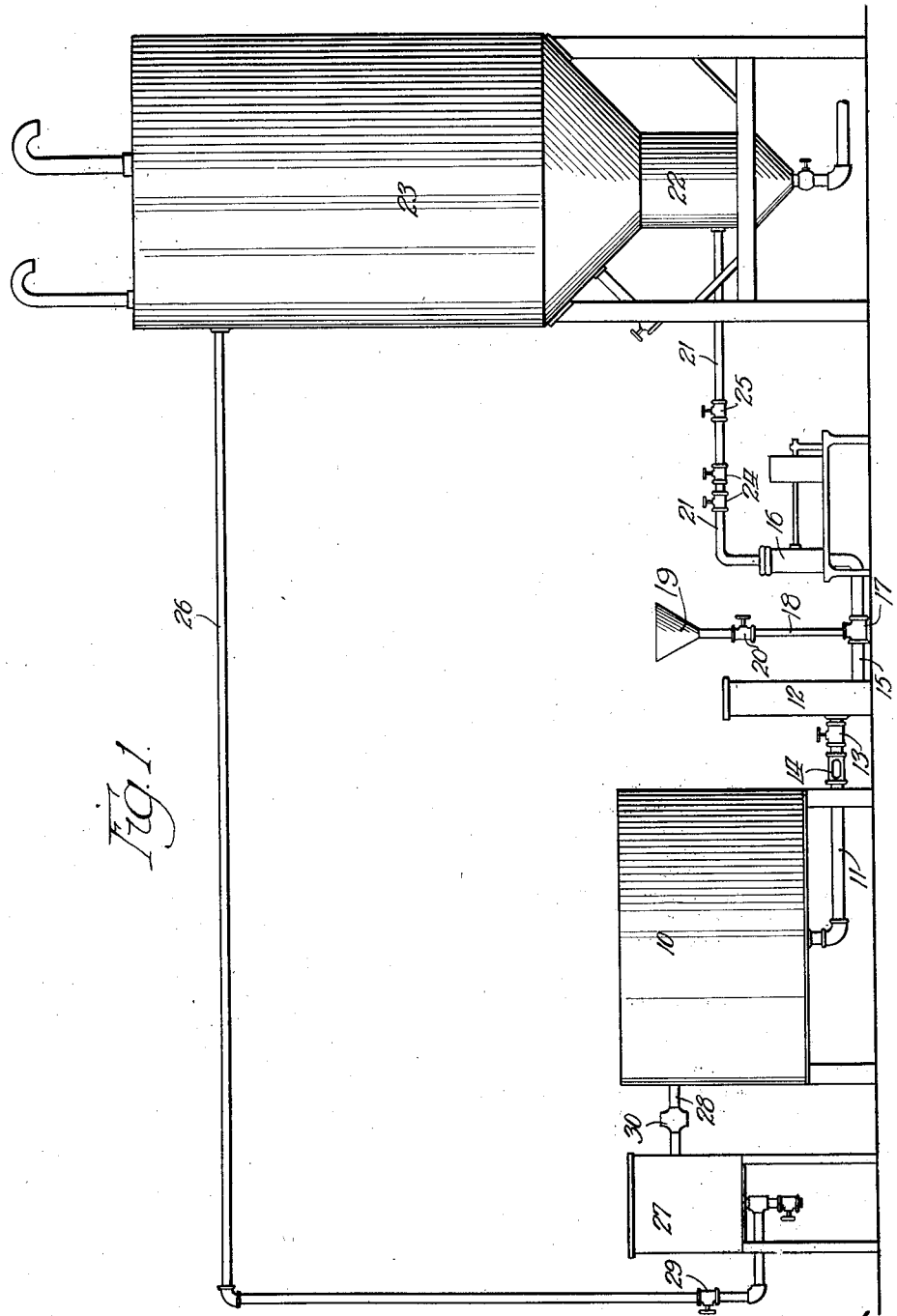

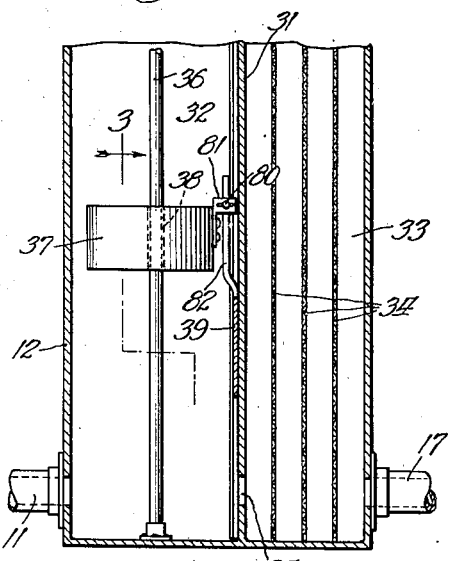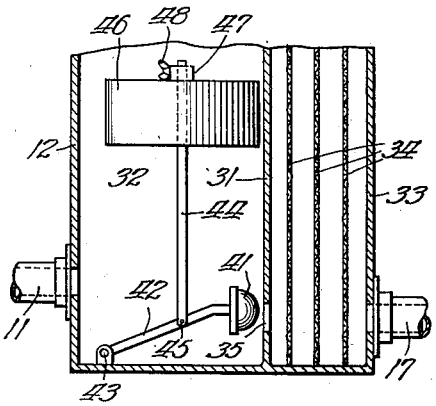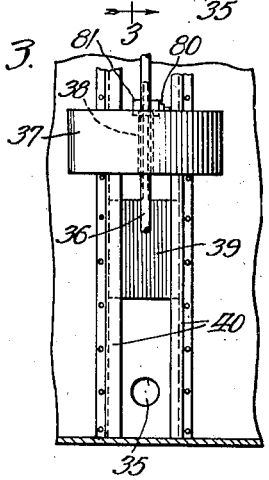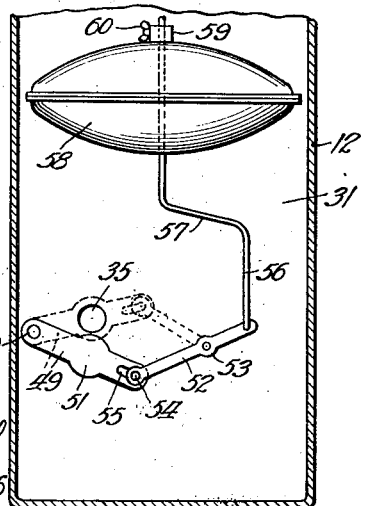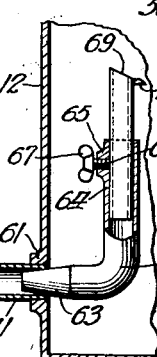

1,637,902

UNITED STATES PATENT OFFICE.

RALPH HOLLAND, OF LARAMIE, WYOMING.

LIQUID-LEVEL-CONTROLLING MEANS FOR DRY-CLEANING SYSTEMS.

Application filed June 30, 1926. Serial No. 119,677.

My invention relates to dry cleaning apparatus and more particularly to means for maintaining a constant level of cleaning fluid in washing machines in such apparatus.

In dry cleaning apparatus, it is customary to provide means for clarifying the cleaning fluid, such as gasoline, and one of the most desirable methods of clarifying the same is to provide for a continuous flow of the cleaning fluid from the washing machine to the clarifier and from the clarifier to the washing machine, thus providing a continuous flow of the cleaning fluid throughout the apparatus. In such apparatus it is desirable to provide for means to maintain a substantially constant level of the cleaning fluid in the washing machine, and it is one of the purposes of my invention to provide means for maintaining a substantially constant level of cleaning fluid in a washing machine in dry cleaning apparatus.

It is a further purpose of my invention to provide means for maintaining a predetermined substantially constant level of cleaning fluid in a washing machine, that is associated with the discharge connection of said washing machine and that is controlled in its action by the level of the liquid in the washing machine. In continuous flow systems embodying a washing machine and a clarifying apparatus, it is customary to provide a trap between the washing machine and the clarifier for catching any large particles of foreign matter in the cleaning fluid before the same reaches the clarifier, and preferably my liquid level controlling means is associated with said trap.

The means for maintaining the substantially constant level of the cleaning fluid in the washing machine may be either float controlled or otherwise and may be either adjustable or not, as desired. Preferably said means is adjustable and is made without any moving parts. To accomplish this, the means is preferably in the form of an adjustable overflow for the washing machine in the trap.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art, and as would fall within the scope of the claims.

In the drawings—

Fig. 1 is a diagrammatic view in elevation of a dry cleaning apparatus embodying my invention;

Fig. 2 is a fragmentary enlarged section of a trap embodying one form of my liquid level controlling means;

Fig. 3 is a section taken on the line 3—3 of Fig. 2;

Fig. 4 is a view similar to Fig. 2 of another form of liquid level controlling means;

Fig. 5 is a transverse section partly broken away of a trap embodying still another form of the liquid level controlling means;

Fig. 6 is a view partly in section and partly in elevation of a portion of a washing machine and trap showing liquid level controlling means embodying an adjustable overflow on the discharge pipe from the wasning machine and Fig. 7 is an enlarged detail sectional view of the overflow connection shown in Fig. 6.

Referring in detail to the drawings, in Fig. 1 is shown a dry cleaning apparatus comprising a washing machine 10, from which the discharge pipe 11 leads to the trap 12 a valve 13 being provided in the pipe 11 for shutting off the flow of cleaning fluid through said pipe. A sight glass 14 may also be provided in the pipe 11 for observing the condition of the cleaning fluid as it flows through the pipe 11.

From the trap 12 a pipe 15 leads to the pump 16, a T 17 being provided in said pipe from which the vertically extending pipe 18 extends upwardly. A funnel 19 is provided on the upper end of the pipe 18 through which clarifying solution may be introduced into the system, a valve being provided at 20 to shut off the funnel from the pipe 18 when desired.

From the pump 16 the pipe 21 leads to the reduced depending portion 22 of the clarifier 23, a pair of check valves 24 and a shut off valve 25 being provided in said pipe. From the clarifier the pipe 26 feeds the clarified cleaning fluid to the filter 27, from which the same passes through the pipe 28 to the washing machine 10. The cleaning fluid thus reaches the washing machine in a perfectly clean condition. A shut off valve 29 is provided in the pipe 26 and a sight glass 30 is preferably provided in the pipe 28.

In order to prevent the pump 16 from withdrawing the cleaning fluid too rapidly from the washing machine 10 liquid level controlling means, forming the subject matter of the present invention, is provided. One form of such means is shown in Figs. 2 and 3, in which the discharge pipe 11 from the washing machine enters the trap 12 near the bottom thereof, said trap being shown as being provided with a partition 31 extending vertically therein and dividing the same into the chambers 32 and 33, the chamber 32 being in direct communication with the washing machine through the pipe 11 and the chamber 33 having the vertically extending screens 34 therein and being provided with the pipe 17 leading to the pump. The partition 31 is provided with the opening 35 for establishing communication between the chambers 32 and 33. In the chamber 32 is a vertically extending guide rod 36, upon which the float 37 is slidably mounted, said guide rod passing through a passage 38 in said float. Adjustably secured to the float 37 by means of the set screw 80 on the collar 81, engaging the stem 82, is the slide valve member 39 which is guided in its movements by means of the undercut guides 40. When the level of the liquid in the washing machine rises, the level of the liquid in the chamber 32 rises similarly, thus raising the float 38 and with it the valve 39. The valve 39 is positioned over the opening 35 when the level of the liquid in the washing machine is below that desired or at the level desired, but when the level of the liquid in the washing machine reaches a higher level than is desired the valve uncovers the port or opening 35 and the liquid passes into the chamber 33, lowering the level of the liquid in the chamber 32 and in the washing machine.

Instead of providing a float operated valve such as described above, a pivoted valve member may be provided, such as shown in Fig. 4, in which the trap 12 if again divided into the chambers 32 and 33 by means of the partition 31, the screens 34 being also again provided in the chamber 33. However, the opening 35 in the partition 31, in this case is closed by means of the valve member 41, mounted on the lever 42 pivotally mounted between a pair of ears 43, and having the rod 44 pivoted thereto at 45. The rod 44 has the float 46 mounted thereon, said float being provided with a collar 47 embracing the rod 44 and provided with a set screw 48 for clamping the same in any desired adjusted position on the rod 44. Thus the float 46 is adjustable on the rod 44, whereby the valve 41 serves to regulate the level of the liquid in the washing machine to any predetermined adjusted height.

In Fig. 5 another form of pivotally mounted valve is shown, the valve 49 being pivotally mounted on the partition 31 at 50 and having an enlarged portion 51 adapted to align with the opening 35 to close the same. A lever 52 is pivotally supported upon the bracket 53 and is provided with a pin 54 at one end thereof operating in the slot 55 in the valve member 49. Pivotally connected with the other end of the lever 52 is a rod, which may be offset as at 57 and which carries the float 58, said float 58 having a sleevelike member 59 depending therefrom provided with a set screw 60 for adjustably clamping the float in position on the rod 56.

In Figs. 6 and 7 a still simpler and in many respects more desirable liquid level controlling device is shown, that includes no moving parts. The trap 12 in this arrangement need not have a partition therein and none is shown in the drawings. The pipe 11 leading from the washing machine is secured in a hollow boss 61 provided on the trap 12 and a curved pipe 62 having a tapered end 63 fitted within the pipe 11 is provided in the trap 12. The pipe 62 is provided with an upwardly extending portion 64 having a thickened portion 65 having a set screw 66 mounted therein, said set screw having a winged head 67. Held in adjustable position within the portion 64 by means of the set screw 66 is the adjustable extension 68 having preferably an inclined upper edge 69 and a lip 70 provided with a highly polished, and preferably nickel plated, upper surface. The flow of the gasoline or other cleaning fluid over the member 70 can be observed by raising the hinged cover 71 of the trap, and due to the mirror-like upper face of the lip 70 the condition of the cleaning fluid can readily be seen.

In the form of the invention shown in Figs. 6 and 7, the pump withdraws the liquid from the trap 12 at a more rapid rate than the same enters through the pipe 11, and as a result the level of the liquid in the trap is always below that of the liquid in the washing machine. Consequently the extension 68 acts as an adjustable overflow for the washing machine 10, and the liquid can be held at a predetermined level in the washing machine by means of said device without the use of a valve or other moving parts.

Having thus described my invention what I desire to claim and secure by United States Letters Patent is:

1. In dry cleaning apparatus of the character described, a washing machine, means for feeding a cleaning fluid to said machine, and adjustable means controlling the discharge of said fluid from said machine for maintaining a substantially constant predetermined level of cleaning fluid in said machine.

2. In dry cleaning apparatus of the character described, a washing machine, means for feeding a cleaning fluid to said machine, a discharge connection leading from said machine and means associated with said discharge connection controlling the discharge of said fluid from said machine for maintaining a substantially constant predetermined level of cleaning fluid in said machine.

3. In dry cleaning apparatus of the character described, a washing machine, means for feeding a cleaning fluid to said machine, a discharge connection leading from said machine, a trap into which said connection empties and means in said trap for maintaining a substantially constant predetermined level of cleaning fluid in said machine.

4. In dry cleaning apparatus of the character described, a washing machine, means for feeding a cleaning fluid to said machine, a discharge connection leading from said machine, a trap into which said connection empties and adjustable means in said trap for maintaining a substantially constant predetermined level of cleaning fluid in said machine.

5. In dry cleaninig apparatus of the character described, a washing machine, means for feeding a cleaning fluid to said machine, a discharge connection leading from said machine, a trap into which said connection empties and means in said trap governing the flow of said fluid from said machine in accordance with the level of the fluid in said machine.

6. In dry cleaning apparatus of the character described, a washing machine, means for feeding a cleaning fluid to said machine, a discharge connection leading from said machine, a trap into which said connection empties and adjustable means in said trap governing the flow of said fluid from said machine in accordance with the level of the fluid in said machine.

7. In dry cleaning apparatus of the character described, a washing machine, means for feeding a cleaning fluid to said machine, a discharge connection leading from said machine, a trap into which said connection empties, and liquid level controlling means in said trap for maintaining a substantially constant predetermined level of cleaning fluid in said machine.

8. In dry cleaning apparatus of the character described, a washing machine, a clarifying device feeding cleaning fluid to said machine, a trap connected with the discharge end of said washing machine, a pump for drawing said fluid through said trap and forcing the same into said clarifying device and means in said trap controlling the discharge of said fluid from said machine for maintaining a substantially constant predetermined level of cleaning fluid in said washing machine.

9. In dry cleaning apparatus of the character described, a washing machine, a clarifying device feeding cleaning fluid to said machine, a trap connected with the discharge end of said washing machine, a pump for drawing said fluid through said trap and forcing the same into said clarifying device and adjustable means in said trap controlling the discharge of said fluid from said machine for maintaining a substantially constant predetermined level of cleaning fluid in said washing machine.

10. In dry cleaning apparatus of the character described, a washing machine, a clarifying device feeding cleaning fluid to said machine, a trap connected with the discharge end of said washing machine, a pump for drawing said fluid through said trap and forcing the same into said clarifying device and liquid level controlling means in said trap controlling the discharge of said fluid from said machine for maintaining a substantially constant predetermined level of cleaning fluid in said washing machine.

11. In dry cleaning apparatus of the character described, a washing machine, a clarifying device feeding cleaning fluid to said machine, a trap connected with the discharge end of said washing machine, a pump for drawing said fluid through said trap and forcing the same into said clarifying device and adjustable means in said trap controlling the discharge of said fluid from said machine for maintaining a substantially constant predetermined level of cleaning fluid in said washing machine, said means having a mirrorlike surface over which said fluid flows.

In witness whereof, I hereunto subscribe my name this 18th day of March, A. D. 1926.

RALPH HOLLAND.